(12) United States Patent
Uehara

(10) Patent No.: US 6,218,981 B1
(45) Date of Patent: Apr. 17, 2001

(54) RADAR DEVICE FOR VEHICLE

(75) Inventor: Naohisa Uehara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,840

(22) Filed: Sep. 21, 1999

(30) Foreign Application Priority Data

May 20, 1999 (JP) .................................................. 11-139607

(51) Int. Cl.⁷ .............................. G01S 7/34; G01S 13/60
(52) U.S. Cl. .............................. 342/70; 342/92; 342/107; 342/158
(58) Field of Search .................................... 342/70, 71, 72, 342/89, 91, 92, 107, 115, 133, 135, 139, 146, 157, 158

(56) References Cited

U.S. PATENT DOCUMENTS 3,680,085 * 7/1972 Del Signore .......................... 342/128
5,938,717 * 8/1999 Dunne et al. ......................... 701/117
5,959,571 * 9/1999 Aoyagi et al. ......................... 342/70

FOREIGN PATENT DOCUMENTS 7-20016    3/1995  (JP) .
7-92258    4/1995  (JP) .

* cited by examiner

Primary Examiner—John B. Sotomayor
(74) Attorney, Agent, or Firm—Sughrue, Mion, Zinn, Macpeak & Seas, PLLC

(57) ABSTRACT

A radar device for vehicle comprising a means for transmitting electromagnetic waves, a means for receiving the electromagnetic waves reflected by a target object, a signal processing means for obtaining a range, a relative velocity, and receipt intensity of the target object based on an output from the transmitting means and an input in the receiving means, a scanning means for changing directions of transmitting and receiving the electromagnetic waves, and an operating means for calculating a direction of the target object based on the receiving intensity of the target object in a plurality of directions, wherein the amounts of AGC in the receiving means in the plurality of directions are independently controlled, whereby a maximum detectable range as an inherent performance of radar is not deteriorated under any driving situation and a position of the preceding vehicle is securely detected.

6 Claims, 8 Drawing Sheets

RADAR DEVICE FOR VEHICLE

BACKGROUND OF THE INVENTION

1. Field of the Invention

The present invention relates to a radar device for vehicle used for measuring, for example, following-on distances.

2. Discussion of Background

Figure 11:
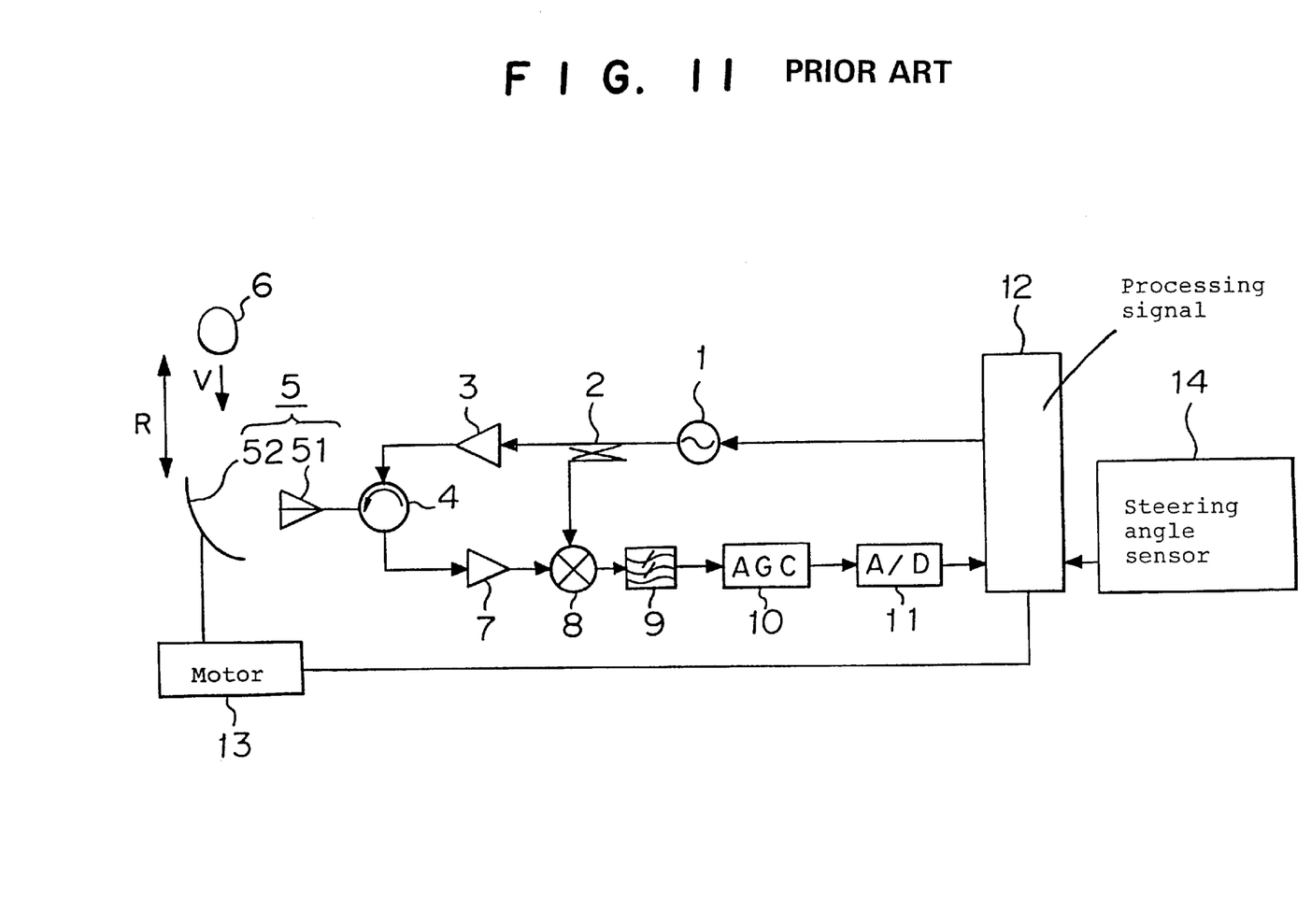
FIG. 11 is a block chart for illustrating a structure of a conventional radar device for vehicle.

A FM-CW radar device as illustrated in FIG. 11 is known as a radar device for vehicle, wherein the radar device is miniaturized using an antenna for transmitting and receiving to improve applicability to a vehicle. In FIG. 11, numerical reference 1 designates an oscillator; numerical reference 2 designates a power divider; numerical reference 3 designates a transmitting amplifier; numerical reference 4 designates a circulator; numerical reference 5 designates a transmitting and receiving antenna composed of a hone antenna 51 and a reflecting mirror antenna 52; numerical reference 6 designates a target object; numerical reference 7 designates a receiving amplifier; numerical reference 8 designates a mixer; numerical reference 9 designates a filter; numerical reference 10 designates an automatic gain control (AGC) amplifier; numerical reference 11 designates an A/D converter; numerical reference 12 designates a signal processing unit; numerical reference 13 designates an antenna scanning motor; and numerical reference 14 designates a steering angle sensor. A transmitting means is composed of numerical references 1 through 5; a receiving means is composed of numerical references 4, 5, 7 and 8; a signal processing means is composed of numerical references 9 through 12; and a scanning means is composed of numerical references 13 and 52.

An operation of thus constructed conventional device will be described. The signal processing unit 12 outputs linear voltage signals for frequency modulation. The oscillator 1 generates electromagnetic waves subjected to frequency modulation by the voltage signals for frequency modulation. The electromagnetic waves are divided into two parts by a power divider 2, wherein one of the parts is inputted in the mixer 8. The other part of the electromagnetic waves is amplified by the transmitting amplifier 3. Thereafter, it passes through the circulator 4 and outputted into space from the transmitting and receiving antenna 5. The electromagnetic waves outputted to space from the transmitting and receiving antenna 5 are reflected by the target object 6 and inputted in the transmitting and receiving antenna 5 as receiving electromagnetic waves having a delay time Td with respect to the transmitted electromagnetic waves. Further, when the target object 6 has a relative velocity with respect to the radar device, the receiving electromagnetic waves are inputted in the transmitting and receiving antenna 5 with a Doppler shift fd with respect to the transmitting electromagnetic waves. The electromagnetic waves received by the transmitting and receiving antenna 5 are amplified by the receiving amplifier 7. Thereafter, these electromagnetic waves are mixed with the transmitting electromagnetic waves by the mixer 8 to output beat signals corresponding to the delay time Td and the Doppler shift fd. The obtained beat signals pass through the filter 9 and are inputted in the A/D converter 11 after being amplified in the AGC amplifier 10. The signal processing unit 12 calculates a relative range and a relative velocity for the target object 6 from the beat signals.

Figures 12, 13:
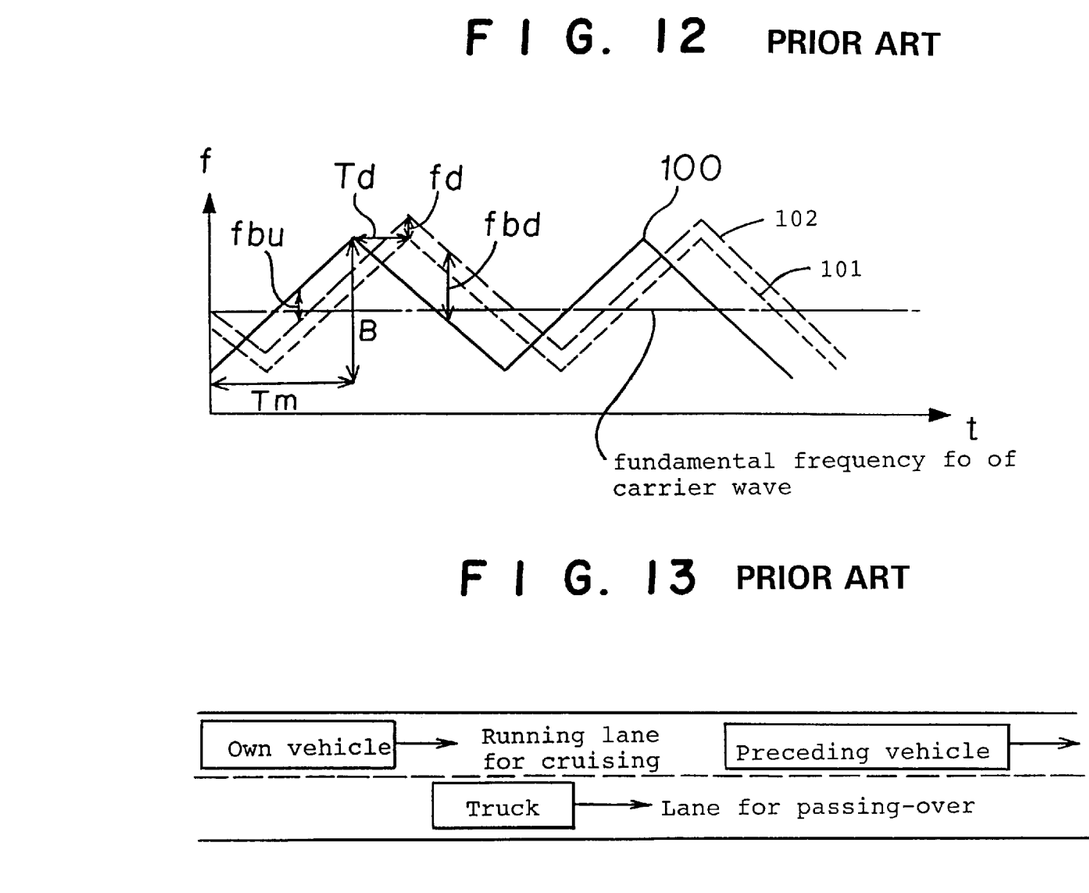
FIG. 12 is a graph for schematically showing a method of calculating relative ranges and relative velocities in the conventional radar device for vehicle.
FIG. 13 illustrates a problematic situation of the conventional radar device for vehicle.

In the next, a method of calculating the relative range and the relative velocity will be described. FIG. 12 is an example of calculating a relative range and a relative velocity using the above-mentioned radar device, wherein an ordinate represents a frequency f and an abscissa represents a time t. In FIG. 12, a transmitting electromagnetic wave 100 is subjected to frequency modulation with a frequency bandwidth in sweeping B and a modulation period Tm. The receiving electromagnetic waves 101, 102 has a delay time Td between a reflection of the transmitting electromagnetic wave by the target object 6 existing at a position of a range R and an input in the transmitting and receiving antenna 5. Further, when the target object 6 has a relative velocity, the receiving electromagnetic waves have a Doppler shift of fd with respect to the transmitting electromagnetic waves. At this time, a difference of frequency between a transmitting signal, i.e. the transmitting electromagnetic wave, and a receiving signal, i.e. the receiving electromagnetic waves, in case that a frequency of the receiving signal is increased and a difference of frequency fbd between the transmitting signal and the receiving signal, i.e. the receiving electromagnetic waves, in case that a frequency of the receiving signal is decreased are outputted from the mixer 8 as beat signals. These beat signals are subjected to an analogue-digital conversion by the A/D converter 11, taken in the signal processing unit 12 as data, and subjected to a fast Fourier transformation (FFT) to obtain the above-mentioned fbu and fbd and receiving levels M thereof, wherein the receiving levels of fbu and fbd are usually the same M.

The relative range R and the relative velocity V of the target object is obtainable by the following Equation 1.

$$R = \frac{TmC}{4B}(fbu + fbd),$$ [Equation 1]

$$V = \frac{\lambda}{4}(fbu - fbd)$$

where reference C designates the light velocity of $3.0 \times 10^8$ m/s; and reference $\lambda$ designates a wavelength of carrier wave, wherein $\lambda = 4.0 \times 10^{-3}$ m when a fundamental frequency of the carrier wave is $f_0 = 77$ GHz.

Incidentally, in case that a plurality of target objects exists, fbu and fbd of an identical target object is selected among a plurality of differences of frequency fbu between the transmitting signal and the receiving signal in case that the frequency of the receiving signal is increased or among a plurality of differences of frequency fbd between the transmitting signal and the receiving signal in case that the frequency of the receiving signal is decreased, and relative ranges R and relative velocities V respectively for the plurality of target objects are obtained by Equation 1.

In the next, a method of operating a direction of the target object 6 by the signal processing unit 12 using the receiving level M will be described. Conventionally, in operating a direction, typical methods such as a mono pulse method, a sequential roving method, and a conical scanning method are disclosed in, for example, JP-B-7-20016. The sequential roving method will be described. This method equal to a method of measuring angle in an ample range by normalizing a difference of two receiving levels of radar beam having different axes as disclosed in JP-A-7-92258.

After measuring a range, a relative velocity, and a receiving level M1 in a predetermined direction θ1, the signal processing unit 12 similarly measures a range, a relative velocity, and a relative velocity M2 in a next direction θ2 by operating the motor 13. Among these plurality of detected data, the same data of the ranges and the relative velocities are selected to measure an angle based on a relationship of magnitude between the receiving level M1 and the receiving level M2.

Specifically, a sum pattern $S(\theta)$ and a difference pattern $D(\theta)$ are obtained from antenna beam patterns $B1(\theta)$ and $B2(\theta)$ in the predetermined two directions $\theta1$ and $\theta2$ as follows:

$$S(\theta)=B1(\theta)+B2(\theta) \qquad \text{Equation 4}$$

$$D(\theta)=B1(\theta)-B2(\theta) \qquad \text{Equation 5}$$

In the next, a discriminatior $DS(\theta)$ standardized by $S(\theta)$ is obtained.

$$DS(\theta)=D(\theta)/S(\theta) \qquad \text{Equation 6}$$

where within a half bandwidth $\theta s$ of $S(\theta)$ is monotonously increased or decreased.

By defining a center between the predetermined two directions $\theta1$ and $\theta2$ as $\theta o$, and the half bandwidth of $S(\theta)$ as $\theta s$, an inclination k of $DS(\theta)$ at around an angle $\theta n$ standardized by $\theta s$ is obtained for a case that $\theta n=0$.

$$\theta n=(\theta-\theta o)/\theta s \qquad \text{Equation 7}$$

$$k=DS(\theta)/\theta n \qquad \text{Equation 8}$$

Further, DS is obtained by observing the receiving levels M1 and M2 using Equation 9.

$$DS=(M1-M2)/(M1+M2) \qquad \text{Equation 9}$$

Resultantly, a direction $\theta$ of a target object is obtained by Equation 10 using $\theta s$, k, and $\theta o$ which can be previously calculated and the observed DS.

$$\theta=\theta s/k \cdot DS+\theta o \qquad \text{Equation 10}$$

Based on thus measured range, relative velocity, and direction of the target object and a curvature of road obtained from the steering angle sensor 14, it is judged whether or not the target object is a preceding vehicle running in a lane where an own vehicle runs to effect an alarm to a following-on distance, a following-on drive with a safe following-on distance, and so on.

However, when the angle is measured by the above-mentioned Equations, it is not possible to measure angles by comparing receiving levels in respective directions if the AGC amplifier 10 is set to have same gains in at least two of the directions. Meanwhile, when the AGC amplifier 10 is set to have same gains in at least two of the directions, there was a problem in operating a system that, under a situation illustrated in FIG. 13, because reflection intensity of a truck closely positioned in a right lane is large, the AGC amplifier is limited by a level of the truck and a preceding vehicle running in the same lane, which is actually required to be detected, can not be detected.

SUMMARY OF THE INVENTION

The present invention is provided to solve the above-mentioned problem inherent in the conventional technique and to provide a radar device for vehicle having a high performance at a low cost, by which a maximum detectable range as an inherent performance of radar is not deteriorated under any driving condition and a position of a preceding vehicle can be securely detected.

According to a first aspect of the present invention, there is provided a radar device for vehicle comprising a means for transmitting electromagnetic waves, a means for receiving the electromagnetic waves reflected by a target object, a signal processing means for obtaining ranges, relative velocities, and receiving intensity of the target object based on outputs from the transmitting means and inputs in the receiving means, a scanning means for changing transmitting and receiving directions of the electromagnetic waves, and an operating means for calculating a direction of the target object using the receiving intensity from the target object in a plurality of directions, wherein the amounts of automatic gain control (AGC) of the receiving means in the plurality of directions are independently controlled.

According to a second aspect of the present invention, the operating means corrects receiving levels of the target object in various directions in response to the amounts of AGC from the receiving means in the plurality of directions in order to measure angles of the target objects.

According to a third aspect of the present invention, the operating means increases the amount of AGC in a direction of mainly detecting an object having large reflection intensity when it is judged that a preceding vehicle is not detected in at least two directions because of existence of the object having large reflection intensity in other than a lane where an own vehicle runs.

According to a fourth aspect of the present invention, the operating means equalizes the amount of AGC in a direction of mainly detecting an object having large reflection intensity to the amount of AGC in a direction of catching a preceding vehicle when it is judged that the preceding vehicle is not detectable in at least two directions because of existence of the object having large reflection intensity in other than a lane where an own vehicle runs.

According to a fifth aspect of the present invention, continuous waves are transmitted from the transmitting means.

According to a sixth aspect of the present invention, pulse waves are transmitted from the transmitting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 13 as follows, wherein the same numerical references are used for the same or similar portions and description of these portions are omitted.

Embodiment 1

Figure 1:
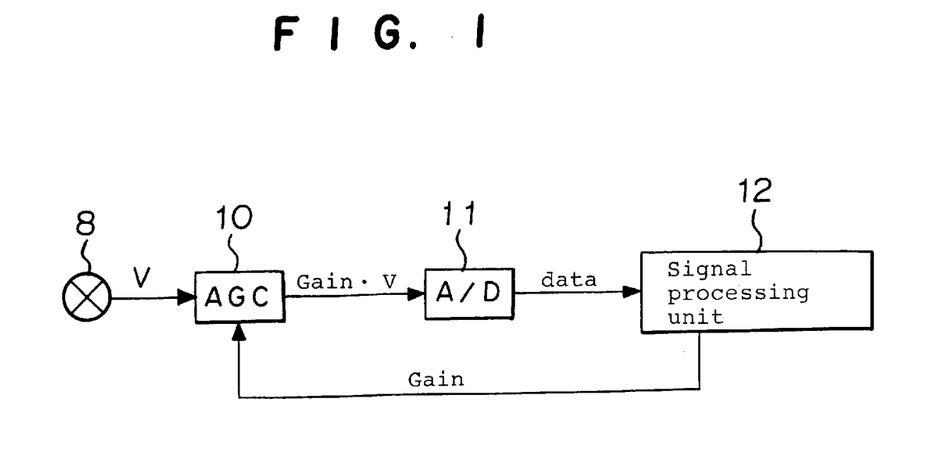
FIG. 1 is a block diagram for illustrating an automatic gain control (AGC) circuit of a radar device for vehicle according to Embodiment 1 of the present invention.

A structure of a radar device and a method of obtaining ranges, velocities, and receiving levels M are the same as those described in the conventional technique illustrated in FIG. 11. A method of controlling AGC will be described. FIG. 1 is a block chart for illustrating an operation of AGC, being an important portion of this invention. In FIG. 1, numerical reference 8 designates a mixer; numerical reference 10 designates an AGC amplifier; numerical reference 11 designates an A/D converter; and numerical reference 12 designates a signal processing unit.

Beat signals V are generated when the mixer 8 receives waves reflected by the target object 6. The beat signals V are amplified to be Gain·V by the AGC amplifier 10 in response to a preset gain of Gain·V. The amplified beat signals are sampled by the A/D converter 11 and transmitted to the signal processing unit 12 as data. The signal processing unit 12 resets the gain of the AGC amplifier based on these data.

Figure 2:
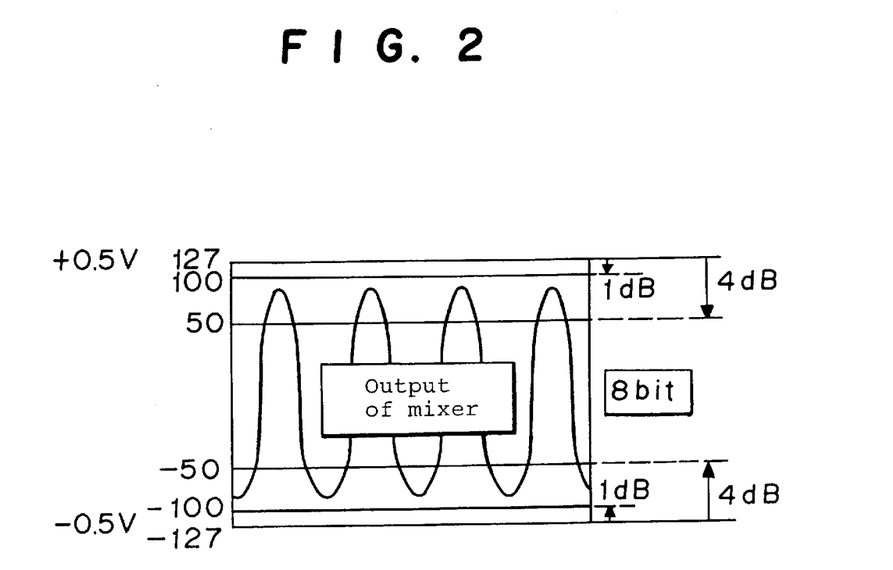
FIG. 2 is a graph for schematically showing an AGC feedback control according to Embodiment 1.

An image of resetting the gain of the AGC amplifier 10 is illustrated in FIG. 2. In FIG. 2, a result that the signals amplified by the AGC amplifier 10 are sampled by the 8-bit A/D converter 11 in a time sequence. The signal processing unit 12 always sets the gain of the AGC amplifier 10 so that maximum amplitude of the amplified signals resides within a predetermined range. In this, it is exemplified that the maximum input value into the A/D converter 11 is 0.5 V corresponding to a digital value of 127; and the minimum input value thereof is –0.5 V corresponding to a digital value of –127. Further, in order to keep a margin, a feedback control is conducted to make the predetermined range between 4 dB lower than the maximum input value, i.e. a digital value of 50 and 1 dB lower than the maximum input value, i.e. a digital value of 100.

A result of such an operation of the AGC amplifier 10 will be described in reference of FIG. 3. As a result of designing a system, there is a difference of 70 dB or more between a maximum receiving power Smax and a minimum receiving power Smin. The maximum receiving power Smax is defined by a reflection level of a flat plate positioned 5 m ahead, and the minimum receiving power Smin is defined as a reflection level of a passenger vehicle positioned 120 m ahead. Further, in order to assure a probability of detecting receiving electromagnetic waves of 90% or more and to suppress a probability of detecting noises to be $10^{-6}$, it is necessary to prepare a margin of about 17 dB in the minimum receiving power Smin with respect to a receiving noise level. This means there must be a dynamic range of about 90 dB in total. However, according to a calculation, an A/D converter having such a dynamic range requires 15 bits, which can not be realized in terms of costs and noises.

Figure 3:
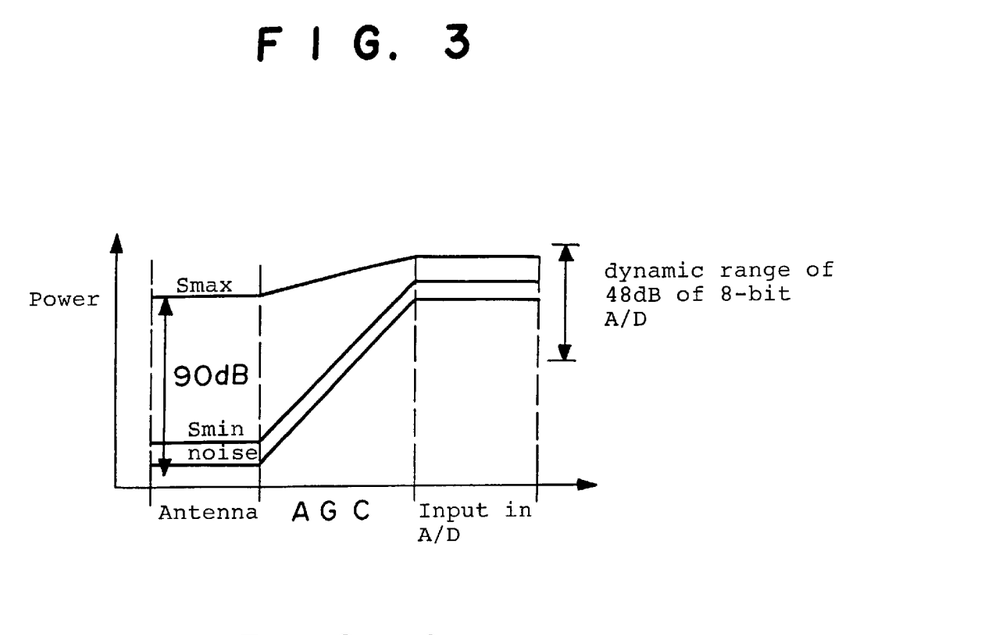
FIG. 3 is a graph for schematically showing a function of AGC according to Embodiment 1.

Based on these backgrounds, as shown in FIG. 3, a gain of AGC is reduced when a reflection having large receiving power, e.g. a target object in a short range, and a gain of AGC is increased in case of a small receiving power, e.g. a target object in a long range, wherein a target object in a short range through a long range can be detected by performing a feedback control for the AGC by monitoring a maximum amplitude outputted to the A/D converter so as to converge receiving electromagnetic waves into a dynamic range of the A/D converter even though the number of bits of the A/D converter is small.

Figure 4:
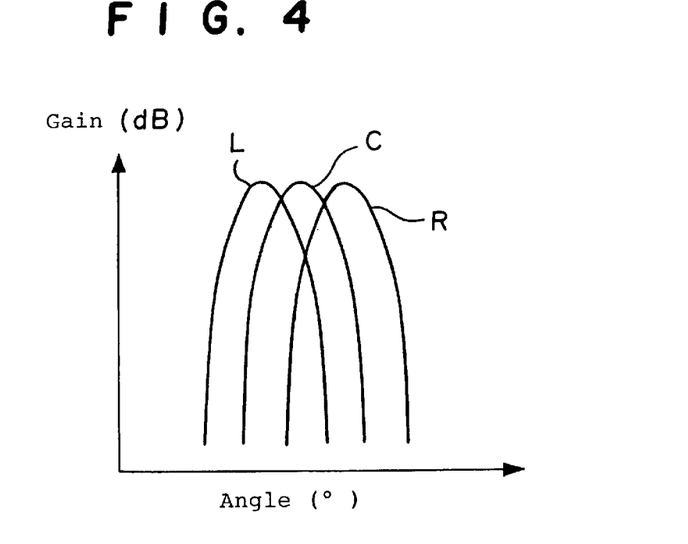
FIG. 4 is a graph for schematically showing three beams according to Embodiment 1 of the present invention.

In the next, a scanning method will be described. Hereinbelow, a case that the number of scanning beams is three will be described. In FIG. 11, the antenna scanning motor 13 is controlled to stop the reflecting mirror antenna 52 at angles corresponding to predetermined three directions. Thus constructed beam patterns of the radar device are composed of a left beam L outputted in a left direction, a middle beam C outputted to a middle direction, and a right beam R outputted to a right direction as illustrated in FIG. 4.

In the next, an operation of measuring angle will be described. In order to measure an angle of the target object 6, a range, a relative velocity, and signal intensity M are obtained for each beam and receiving levels M of those having the same ranges and relative velocities are compared to measure the angle. As described in the conventional technique, it is necessary that the gains of the AGC amplifier 10 should be the same in the three directions for comparing the amplitude in this method, wherein a preceding vehicle can not be detected in a certain driving condition as described.

In Embodiment 1, in order to solve such problems, amounts of AGC of the receiving means in a plurality of directions are independently controlled, and receiving levels of a target object in various directions are corrected in response to respective amounts of AGC for measuring an angle. Such procedure will be specifically described in reference of a flow chart of FIG. 5. In S1, 0 is substituted into a variable i designating a scanning direction; in S2, sampling beat signals V are sampled by the A/D converter 11 for a predetermined times by directing the antenna to a predetermined direction; in S3, a maximum value of thus obtained beat signals V is acquired; in S4 and S5, the AGC is subjected to a feedback control with steps of 2 dB so that the maximum value of the beat signals within the predetermined range between a maximum value of A/D converter –1 dB and the maximum value of A/D converter –4 dB as described in reference of FIG. 2. The reason why a width of the predetermined range is set to be 3 dB is that a margin is added for preventing hunching from occurring when steps of the AGC gain are 2 dB. Further, although the steps of 2 dB is exemplified, the gain may be changed to be linear in response to the magnitudes of the beat signals V.

Figure 5:
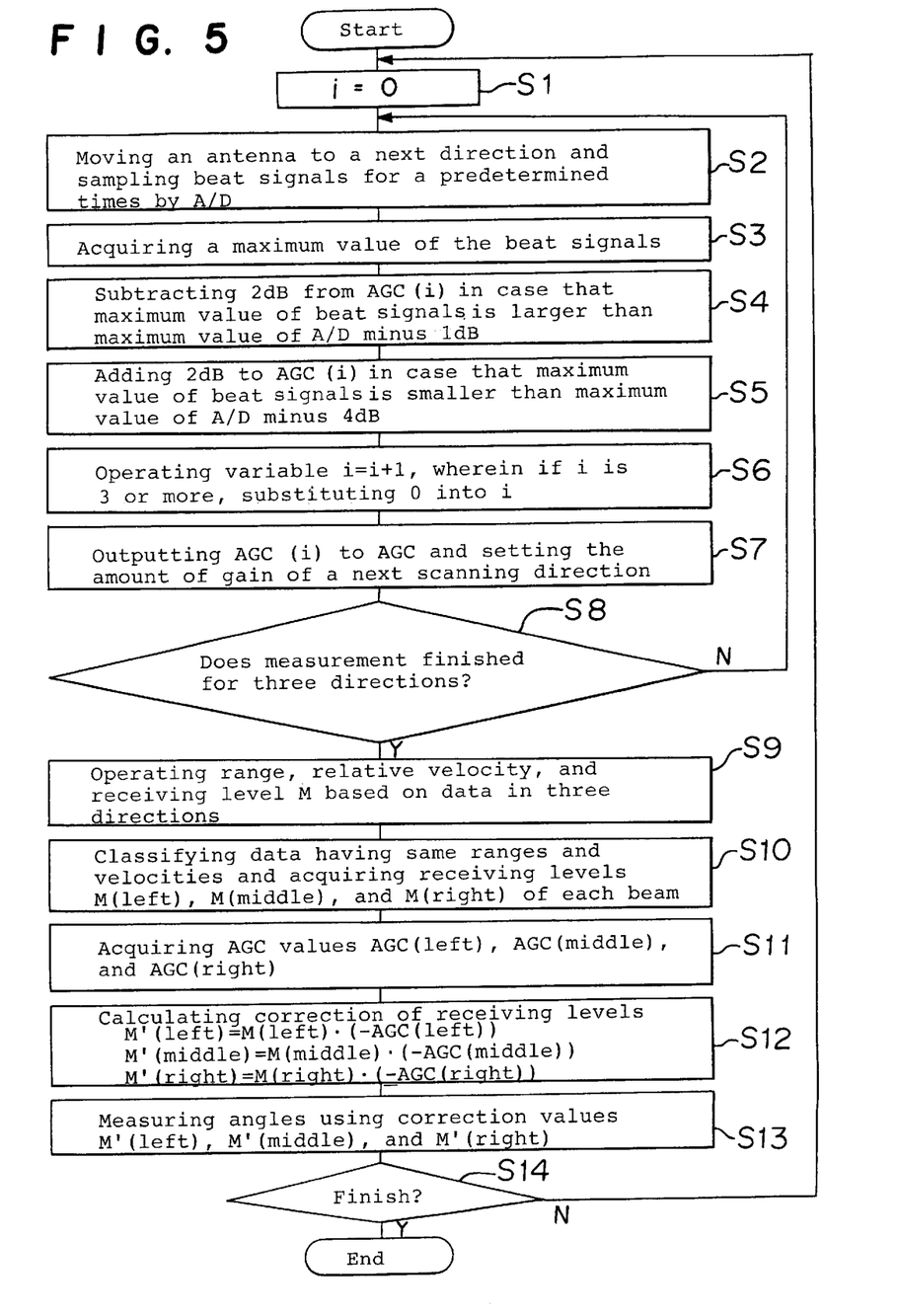
FIG. 5 is a flow chart for illustrating an operation of Embodiment 1.

In S6, the variable i is increased for setting the AGC value in a next scanning direction; in S7, a gain is set by outputting predetermined AGC values in the next scanning direction to the AGC; and in S8, S1 through S7 are repeated for the three directions to acquire independent beat signals V in the three directions in the AGC.

By conducting a fast Fourier transformation (FFT) process for the beat signals in the three directions for obtaining ranges, relative velocities, and receiving levels M of an object to be detected in the three directions in accordance with the method of the conventional technique. In S10, the objects to be detected having same ranges and relative velocities in all directions are regarded as an identical target object, and receiving levels M (left), M (middle), and M (right) in respective directions are classified. In S11, AGC (left), AGC (middle), and AGC (right) of the AGC values obtained at a time of measuring each beam, namely preset values prior to the currently set AGC amount, are acquired. In S12, the receiving levels M are respectively reduced by the AGC amounts in each direction to enable comparison of the receiving levels. Although the receiving levels M' are calculated based on a state that the AGC amount is 0 dB, i.e. no gain, it is possible to multiply the receiving levels M by a difference from an actual AGC amount using the maximum amount of AGC as a standard so that rounding errors are decreased at calculations. Further, a predetermined AGC amount may be set to be the standard. In S13, because the obtained receiving level correction value M' becomes equal to that an issue the receiving levels in various directions are detected by a certain fixed AGC amount as the standard, the angle is measured using the receiving level correction value M' in accordance with the method of the conventional technique. In S14, it is judged whether or not the measurement is finished, wherein S1 is selected when it is not finished.

As described, according to Embodiment 1 of the present invention, because the AGC amounts of the receiving means in the plurality of directions are independently controlled, it is possible to securely detect the target object without adding any special device and deterioration of the maximum detectable range from that of an inherent function of the radar in any driving condition. Further, it is possible to accurately measure angles because the receiving levels are corrected by the AGC amounts.

Embodiment 2

Under a driving situation illustrated in FIG. 13, although the radar device according to Embodiment 1 securely detects a preceding vehicle, an angle of the preceding vehicle can not be occasionally measured. For example, in case that the preceding vehicle exists far way, although a middle beam can detect the preceding vehicle but a right beam sometimes can not detect the preceding vehicle because a truck having large reflection intensity is possibly detected. Further, in FIG. 13, in case that a road curves right a little, the preceding vehicle can not be detected even by a left beam, wherein the preceding vehicle can be detected only by the middle beam. Under such a situation, an angle can not be measured in accordance with a conventional principle of measuring angle because a target object can not be detected by beams in at least two directions.

Figure 6:
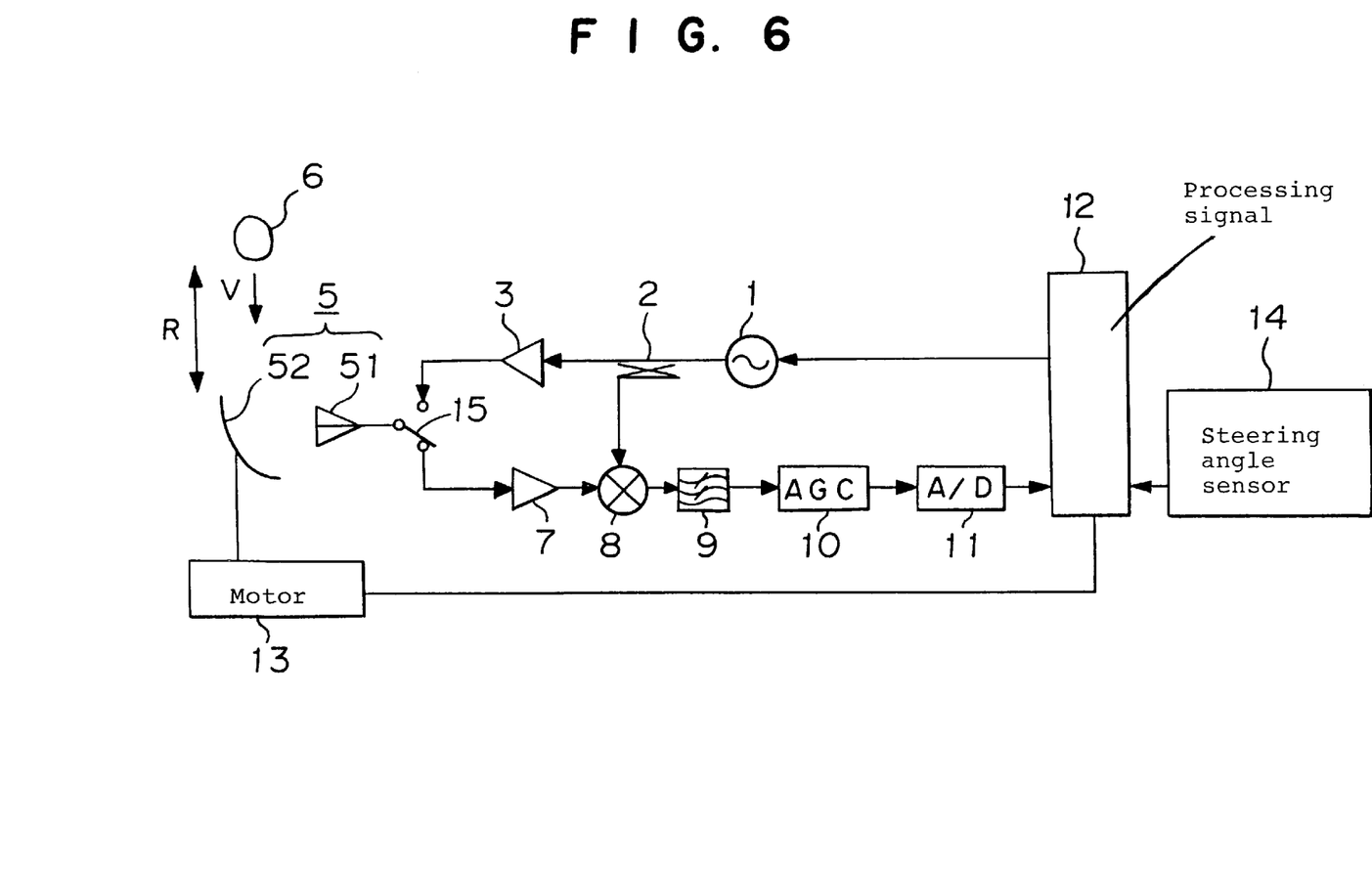
FIG. 6 is a block chart for illustrating a structure of a radar device for vehicle according to Embodiment 2 of the present invention.

Hereinbelow, Embodiment 2 for solving the above-mentioned problems will be described in reference of FIG. 6. FIG. 6 illustrates a structure of a radar device for vehicle according to Embodiment 2, differences from FIG. 11 illustrating the conventional technique are a point that the circulator 4 is changed to a switch for changing transmission and receipt 15 to constitute a pulse Doppler radar. In FIG. 6, numerical reference 1 designates an oscillator for generating electromagnetic waves of, for example a transmitting frequency ftx=76.5 GHz; numerical reference 2 designates a power divider for dividing a power of the electromagnetic waves generated by the oscillator 1 and supplying to both of a transmitting amplifier 3 and a mixer 8; and numerical reference 3 designates the transmitting amplifier for amplifying the divided electromagnetic waves for transmission by the power divider 2.

The switch for changing transmission and receipt 15 connects the antenna 5 to the transmitting amplifier 3 at a time of transmitting electromagnetic waves and connects the antenna 5 to the receiving amplifier 7 at a time of receiving the electromagnetic waves. Numerical reference 5 is the antenna for transmitting and receiving comprising a hone antenna 51 and a reflecting mirror antenna 52. Numerical reference 6 designates a target object having a relative velocity V positioned apart from the radar device by a range R; numerical reference 7 designates a receiving amplifier for amplifying the received electromagnetic waves, being the transmitting electromagnetic waves reflected and returning; numerical reference 8 designates a mixer for mixing electromagnetic waves distributed by the power divider 2 as local oscillator (LD) waves for converting a frequency with the reflected electromagnetic waves, having an intermediate frequency (IF) and/or a radio frequency (RF), returned from the target object 6 and outputting beat signals corresponding to the relative velocity V of the target object 6; numerical reference 9 designates a filter, of which cutoff frequency is a reciprocal of a time width of pulse; numerical reference 10 designates an AGC amplifier which can adjust a gain in response to a receiving power of the reflected electromagnetic waves; numerical reference 11 designates an A/D converter which convert the beat signals to digital signals; and numerical reference 12 designates a signal processing unit which calculates ranges and relative velocities of the target objects based on A/D values.

In the next, an operation of transmitting electromagnetic waves by thus constructed radar device for vehicle according to Embodiment 2 will be described. At first, electromagnetic waves, for example, having a transmitting frequency ftx of 76.5 GHz, are outputted from the oscillator 1. The electromagnetic waves pass through the power divider 2 and are amplified by the transmitting amplifier 3. Because the switch for changing transmission and receipt 15 connects the transmitting amplifier 3 to the antenna 5, the electromagnetic waves amplified by the amplifier 3 pass through the switch for changing transmission and receipt 15 and are outputted to space from the antenna 5.

Figure 7:
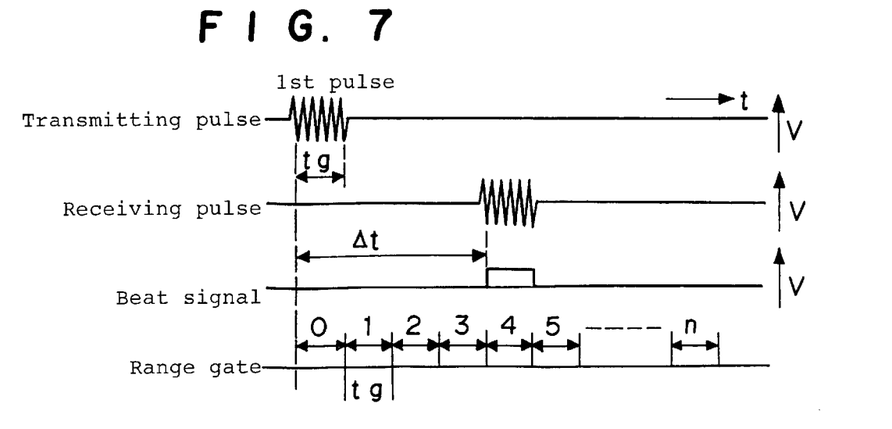
FIG. 7 is a chart for illustrating transmission and receipt of pulse signals according to Embodiment 2 of the present invention.
Figure 8:
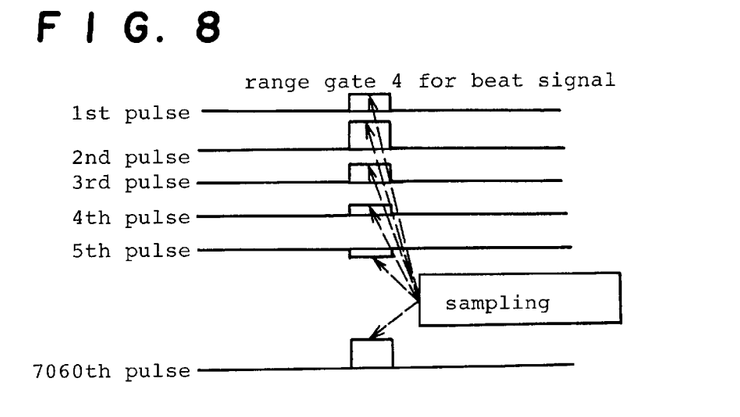
FIG. 8 is a chart for illustrating beat signals according to Embodiment 2.

In the next, an operation of receiving electromagnetic waves will be described. After lapsing a time width of pulse Tg, for example 33.3 ns in 1/30 MHz corresponding to a range of 5 m, from a starting point of transmitting electromagnetic waves, the switch for changing transmission and receipt 15 is switched on a side of receiving to thereby connect the antenna 5 to the receiving amplifier 7. Electromagnetic waves outputted from the antenna 5 to space are reflected by the target object 6 existing at a range R and inputted by the antenna 5 as receiving electromagnetic waves with a delay time Δt depending on the range R with respect to the transmitting electromagnetic waves as shown in FIG. 7. When the target object 6 has a relative velocity, the frequency of receiving electromagnetic waves is inputted in the antenna 5 with a Doppler shift fb in comparison with a frequency of receiving electromagnetic waves ftx. The received electromagnetic waves inputted in the antenna 5 are amplified by the receiving amplifier 7 and mixed with the electromagnetic waves for LO from the power divider 2 by the mixer 8, wherein beat signals corresponding to the Doppler shift fb are outputted as shown in FIG. 7. The beat signals pass through the filter 9 having a cutoff frequency of 30 MHz and are inputted in the A/D converter 11 after being amplified by the AGC amplifier 10.

In the next, a method of operating the range and the relative velocity of the target object 6 based on data inputted into the A/D converter 11 by the signal processing unit 12 will be described. Provided that a resolution power of velocity of 1 km/h is required, a resolution power Δf of Doppler frequency is:

$$\Delta f = \frac{2\Delta V}{\lambda} = \frac{2 \times 0.2777 \text{ m/s}}{0.003921 \text{ m}} = 141.64 \text{ (Hz)} \quad \text{Equation 11}$$
$$= 1/7.05977 \text{ (ms)}$$

where transmitting frequency ftx=76.5 GHz.

Figure 9:
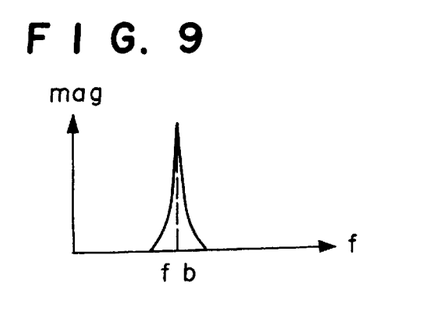
FIG. 9 is a graph for schematically showing a frequency of the beat signal according to Embodiment 2.

This means a time of measuring becomes 7.06 ms. When a maximum measuring distance is, for example, 150 m, a period of repeating pulses becomes 33 ns×150 m/50 m=33.3 ns×30=1 μs as described, wherein, in order to acquire the resolution power of velocity of 1 km/h, beat signals corresponding to pulses as much as 7,060 (=7.06 ms/1 μs) for each range gate are acquired and all data are subjected to FFT for each range gate to thereby output the Doppler shift fb in a range gate as illustrated in FIG. 9. In this, a range and a relative velocity are calculated by Equations 12 and 13.

$$\text{Range} = \frac{tg \times n \times C}{2} \quad \text{Equation 12}$$

$$\text{Relative velocity} = \frac{fb \times c}{2 \times fo} \quad \text{Equation 13}$$

where tg represents a time width of range gate, i.e. time width of pulse; n represents identification of range gate; C represents the light velocity; fb represents a frequency number of beat signals; fo represents a frequency number of transmitting electromagnetic wave of 76.5 GHz.

Thus constructed radar device for vehicle according to Embodiment 2 detects a preceding vehicle by increasing the amount of AGC of a right beam when it is judged that a position of the truck is not in a lane of an own vehicle in FIG. 13. The radar device for vehicle has aims of judging whether or not a target object is the preceding vehicle running through a lane where an own vehicle runs and performing a following-on driving while maintaining a following-on distance or a safe following-on distance, wherein a detection of the preceding vehicle has priority over treatment of a truck as long as it runs out of the lane where the own vehicle runs. In case that the radar device is a frequency modulation-continuous wave (FM-CW) radar, it is difficult to use, because the beat signals V are saturated by the A/D converter, a plurality of high harmonic spectra of real spectra are detected as the right beam. However, in case of a pulse radar, although the truck can not be detected because the beat signals V are saturated by the A/D converter in a range gate where the truck is detected, a correct detection can be performed in a range gate detecting the preceding vehicle because the beat signals V are not saturated by the A/D converter.

Figure 10:
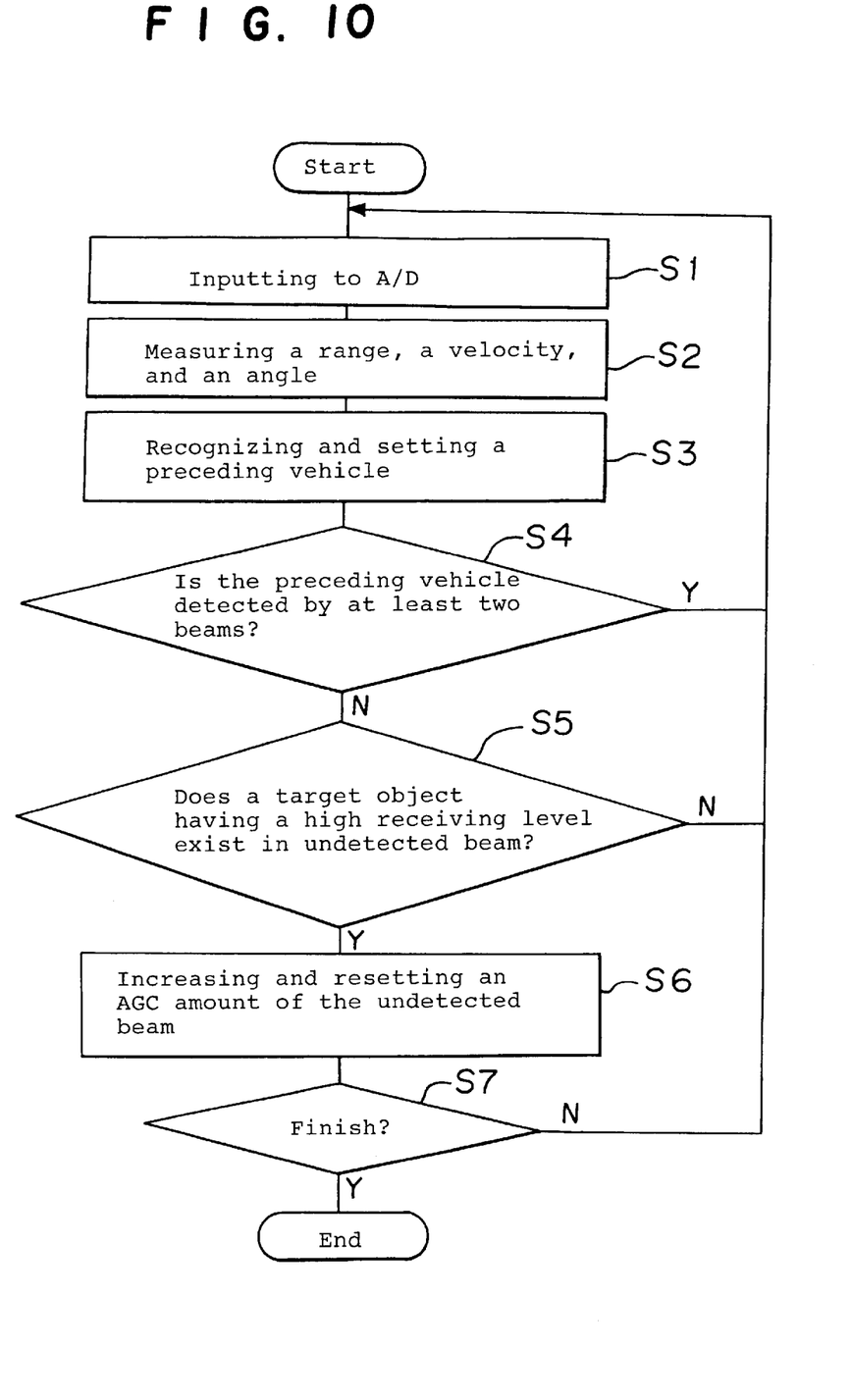
FIG. 10 is a flow chart for illustrating an operation of Embodiment 2 of the present invention.

This will be specifically described in reference of a flow chart illustrated in FIG. 10. In S1, all A/D values in three directions are measured, wherein this process is similar to S1 through S8 of Embodiment 1.

In S2, a range, a relative velocity, and an angle of a target object are measured, which process is similar to S9 through S13 of Embodiment 1.

In S3, a preceding vehicle is recognized and set based on data from an onboard camera, a steering angle sensor 14, a yaw rate sensor or the like or a position of a stopping object in a roadside.

In S4, it is judged whether or not the set data of the preceding vehicle are detected by two beams or more and a measurement is repeated when these are thus detected. In S5, it is judged whether or not a target object having a high receiving level exists in beams not detecting the preceding vehicle and repeating a measurement when such a target object does not exist. In S6, when such a target object exists, the amount of AGC of these detecting beams are linearly or stepwisely increased and reset, wherein the amount of such an increment may be set in values of AGC of the beams securely catching the preceding vehicle or gradually increased so that target objects having a high receiving level are detected as much as possible.

In the next, it is judged whether or not the processes are finished, wherein if there are not finished, S1 is selected to calculate again.

According to Embodiment 2, because the amount of AGC in a direction of detecting an object having large reflection intensity is increased, a position of the preceding vehicle is securely detected without adding any special device and deteriorating an inherent performance of radar concerning a maximum detectable range under any driving situation. Further, by a method of increasing the amount of AGC, an object having large reflection intensity can be detected as much as possible and as fast as possible.

The first advantage of the radar device for vehicle according to the present invention is that a target object can be securely detected and an angle of the target object is securely measured without adding any special device and deteriorating an inherent performance of radar concerning a maximum detectable range under any driving situation.

The second advantage of the radar device for vehicle according to the present invention is that a position of preceding vehicle is securely detected without adding any special device and deteriorating an inherent performance of radar concerning the maximum detectable range under any driving situation.

The third advantage of the radar device for vehicle according to the present invention is that an object having large reflection intensity is detected as much as possible.

Obviously, numerous modifications and variations of the present invention are possible in light of the above teachings. It is therefore to be understood that within the scope of the appended claims, the invention may be practiced otherwise than as specifically described herein.

What is claimed is:

1. A radar device for vehicle comprising:

a means for transmitting electromagnetic waves, a means for receiving the electromagnetic waves reflected by a target object, a signal processing means for obtaining a range, a relative velocity, and receiving intensity of the target object based on an output from said transmitting means and an input in said receiving means, a scanning means for changing directions of transmitting and receiving the electromagnetic waves, and an operating means for calculating a direction of the target object from the receiving intensity of the target object in a plurality of directions, wherein the amounts of AGC of the receiving means in the plurality of directions are independently controlled.

2. The radar device for vehicle according to claim 1, wherein:

said operating means corrects receiving levels of the target object in the plurality of directions in response to the amounts of AGC of the receiving means in the plurality of directions and measures angles.

3. The radar device for vehicle according to claim 2, wherein said operating means increases the amounts of AGC in a direction of mainly detecting an object having large reflection intensity in case that a preceding vehicle is not detected in at least two directions by existence of the object having large reflection intensity running through a lane other than where an own vehicle runs.

4. The radar device for vehicle according to claim 2, wherein said operating means makes the amount of AGC in a direction of mainly detecting an object having large reflection intensity the same as the amount of AGC in a direction of catching a preceding vehicle in case that it is judged that the preceding vehicle is not detected in at least two directions by existence of the object having large reflection intensity running through a lane other than where an own vehicle runs.

5. The radar device for vehicle according to claim 1, wherein continuous waves are transmitted from said transmitting means.

6. The radar device for vehicle according to claim 1, wherein pulse waves are transmitted from said transmitting means.

* * * * *